US011044572B2

(12) United States Patent
Griffith, Jr. et al.

(10) Patent No.: US 11,044,572 B2
(45) Date of Patent: Jun. 22, 2021

(54) SYSTEM AND METHOD FOR CLUSTERING END USERS TO SELECT AND DELIVER A NOTIFICATION TO MOBILE DEVICE

(71) Applicant: Digital Factory Technologies, Inc., Chicago, IL (US)

(72) Inventors: Lawrence Griffith, Jr., Stow, OH (US); Adrian Patrick Delancy, Seattle, WA (US)

(73) Assignee: Digital Factory Technologies, Inc., Chicago, IL (US)

( * ) Notice: Subject to any disclaimer, the term of this patent is extended or adjusted under 35 U.S.C. 154(b) by 0 days.

(21) Appl. No.: 16/555,600

(22) Filed: Aug. 29, 2019

(65) Prior Publication Data

US 2021/0067900 A1 Mar. 4, 2021

(51) Int. Cl.

| | |
|---|---|
| ***H04W 4/021*** | (2018.01) |
| ***H04W 4/02*** | (2018.01) |
| ***G06Q 30/02*** | (2012.01) |
| ***G06N 7/00*** | (2006.01) |

(52) U.S. Cl.
CPC ........ *H04W 4/021* (2013.01); *G06Q 30/0207* (2013.01); *H04W 4/027* (2013.01); *G06N 7/005* (2013.01)

(58) Field of Classification Search
CPC .. H04W 4/021; H04W 4/027; G06Q 30/0207; G06N 7/005
See application file for complete search history.

(56) References Cited

U.S. PATENT DOCUMENTS

| | | | |
|---|---|---|---|
| 6,736,322 | B2 | 5/2004 | Gobburu et al. |
| 6,775,539 | B2 | 8/2004 | Deshpande |
| 6,877,661 | B2 | 4/2005 | Webb et al. |

(Continued)

FOREIGN PATENT DOCUMENTS

| | | | |
|---|---|---|---|
| JP | 2013143004 | A | 7/2013 |
| KR | 100692803 | B1 | 3/2007 |

OTHER PUBLICATIONS

International Search Report and Written Opinion for PCT Application No. PCT/US2020/048836, dated Dec. 28, 2020.

*Primary Examiner* — Yuwen Pan
*Assistant Examiner* — Hung K Du
(74) *Attorney, Agent, or Firm* — Locke Lord LLP; Christopher J. Capelli

(57) ABSTRACT

A system configured to execute programing instructions comprising: receiving a fence including an area having a geographic location, a plurality of notifications and their content attributes are associated with the fence; receiving location and speed from a mobile device of a user; determining the mobile device is stationary for a predetermine amount of time; identifying a location attribute for the location of mobile device; aggregating a plurality of location attributes associated with the user; determining an audience profile and audience profile attributes for the user based on the aggregated location attributes; detecting the user has crossed into an area defined by the fence; and in response to detecting the user crossing the fence: determining a conversion probability based on content attributes of the notifications associated with the fence and audience profile attributes of the audience profile associated with the user; selecting a notification based the conversion probability.

23 Claims, 14 Drawing Sheets

(56) References Cited

U.S. PATENT DOCUMENTS

| | | | |
|---|---|---|---|
| 7,184,972 | B2 | 2/2007 | Flaherty |
| 7,942,319 | B2 | 5/2011 | Bezancon |
| 8,755,824 | B1 | 6/2014 | Wang et al. |
| 10,163,110 | B2 | 12/2018 | Griffith et al. |
| 10,321,264 | B2 | 6/2019 | Phillips et al. |
| 2002/0028681 | A1 | 3/2002 | Lee et al. |
| 2002/0111172 | A1 | 8/2002 | DeWolf et al. |
| 2003/0233276 | A1 | 12/2003 | Pearlman et al. |
| 2005/0240418 | A1 | 10/2005 | Chappuis |
| 2006/0206376 | A1 | 9/2006 | Gibbs et al. |
| 2007/0262860 | A1 | 11/2007 | Salinas |
| 2008/0097851 | A1 | 4/2008 | Bemmel et al. |
| 2008/0235230 | A1 | 9/2008 | Maes |
| 2009/0076896 | A1 | 3/2009 | Dewitt et al. |
| 2009/0032584 | A1 | 5/2009 | Yamada et al. |
| 2009/0157472 | A1 | 6/2009 | Burazin et al. |
| 2009/0171939 | A1 | 7/2009 | Athsani et al. |
| 2011/0106624 | A1* | 5/2011 | Bonner ................... H04L 67/18 705/14.58 |
| 2013/0080239 | A1* | 3/2013 | Okerlund ............. G06Q 20/387 705/14.33 |
| 2014/0349672 | A1 | 11/2014 | Kern, Jr. et al. |
| 2016/0110782 | A1 | 4/2016 | Tadajewski |
| 2019/0034966 | A1* | 1/2019 | Zaheer ............... G06Q 30/0267 |

* cited by examiner

Start
200
Received request to access dashboard
210
Display a map showing plurality of existing microfences
212
Received a signal to display a particular area?
214
No
Yes
Display a map of identified area
216
Received a signal to add a new microfence?
218
No
C
Yes
Update database of microfences with location of new microfence
220
B
A

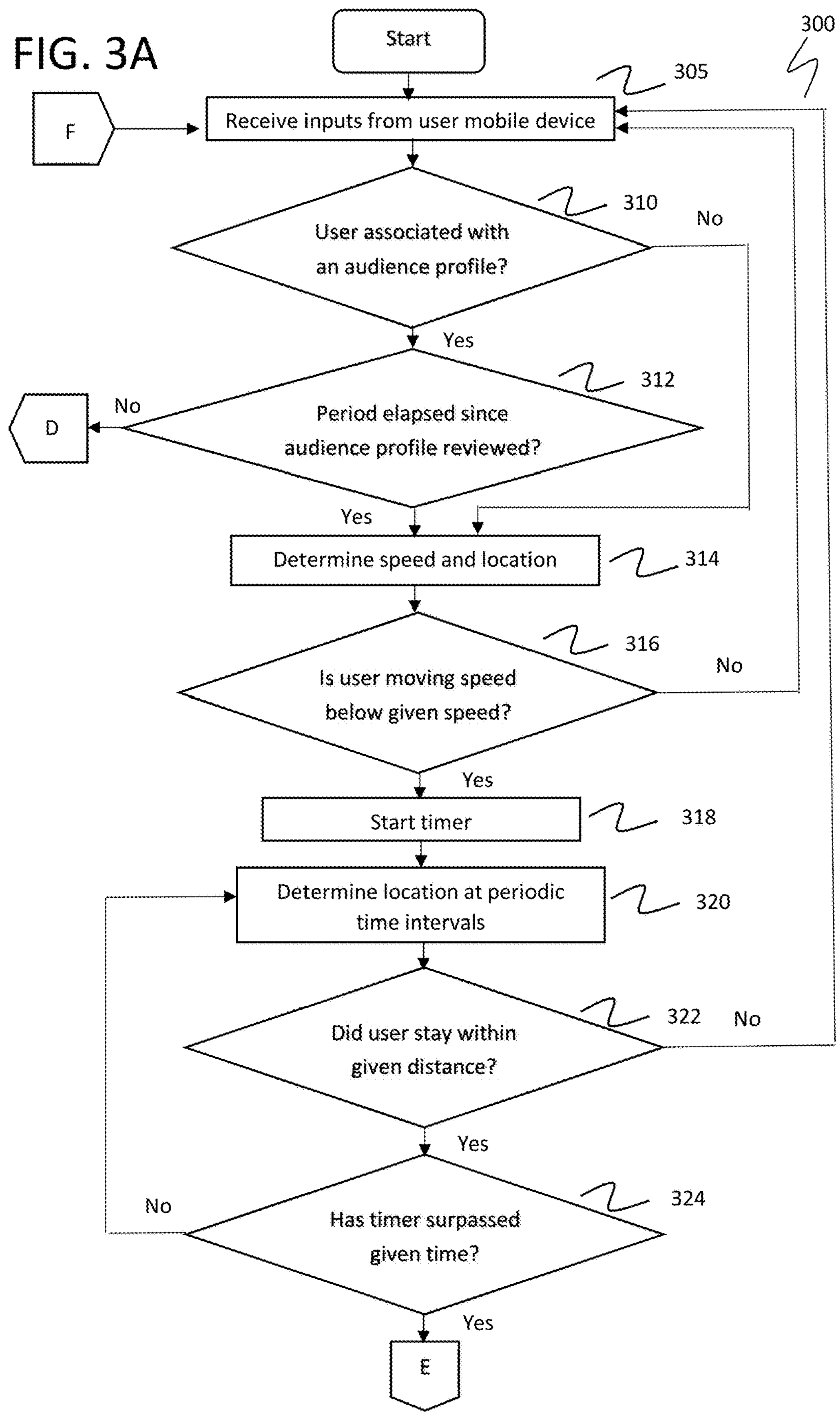
FIG. 3A
Start
300
305
F
Receive inputs from user mobile device
310
No
User associated with an audience profile?
Yes
312
D
No
Period elapsed since audience profile reviewed?
Yes
Determine speed and location
314
316
No
Is user moving speed below given speed?
Yes
Start timer
318
Determine location at periodic time intervals
320
322
No
Did user stay within given distance?
Yes
324
No
Has timer surpassed given time?
Yes
E

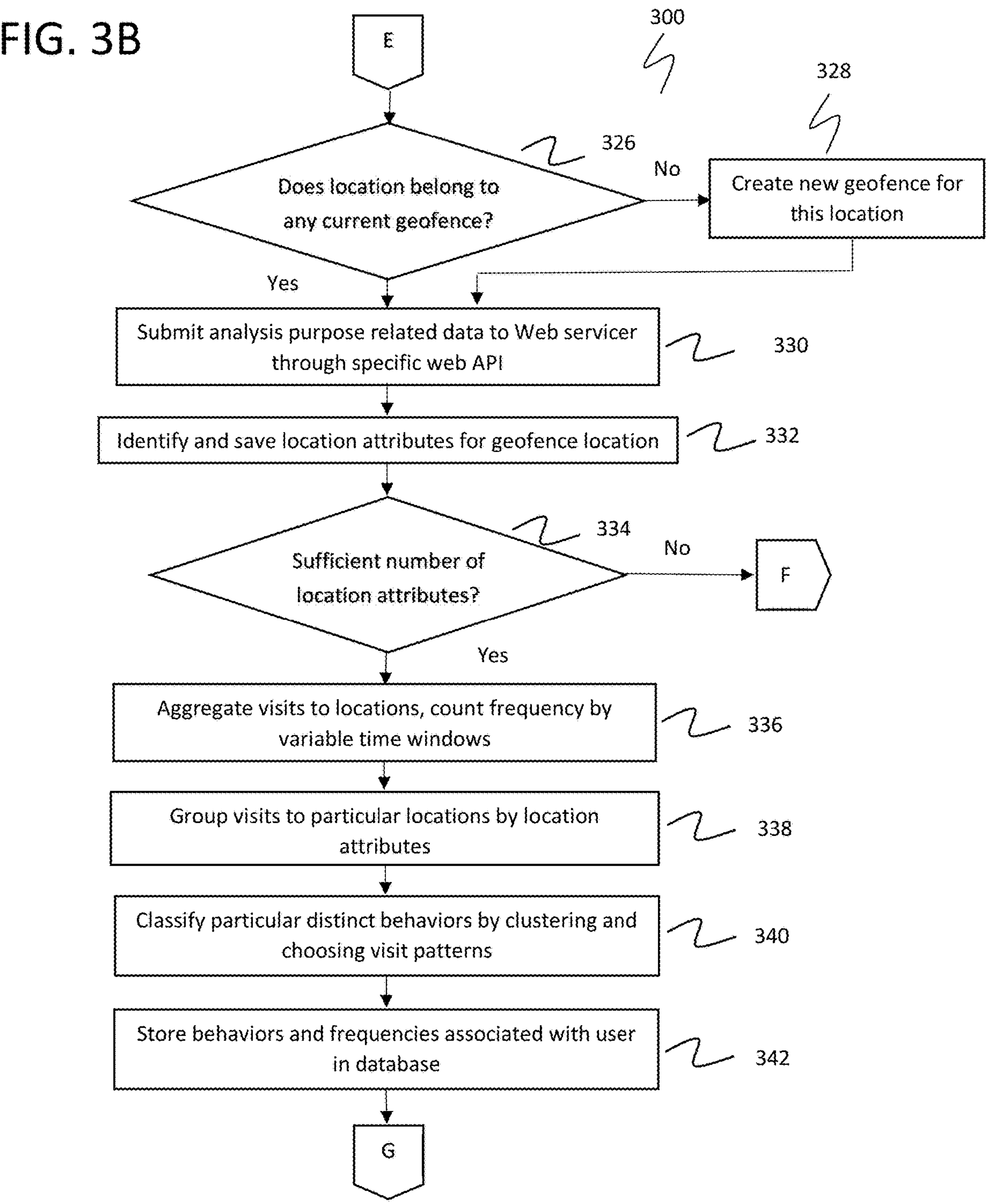
FIG. 3B
E
300
328
326
No
Does location belong to any current geofence?
Create new geofence for this location
Yes
Submit analysis purpose related data to Web servicer through specific web API
330
Identify and save location attributes for geofence location
332
334
No
Sufficient number of location attributes?
F
Yes
Aggregate visits to locations, count frequency by variable time windows
336
Group visits to particular locations by location attributes
338
Classify particular distinct behaviors by clustering and choosing visit patterns
340
Store behaviors and frequencies associated with user in database
342
G

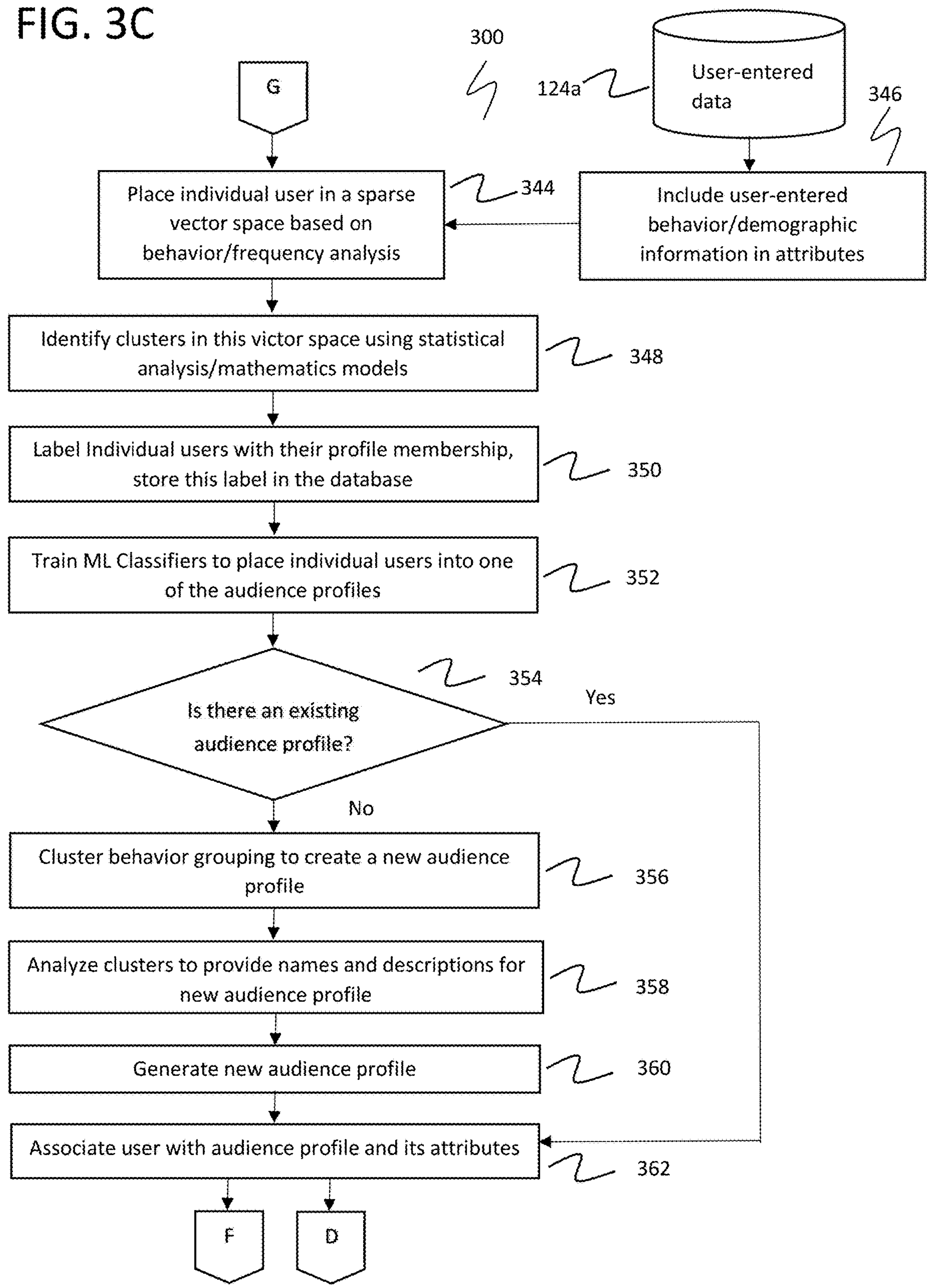
FIG. 3C
300
G
124a
User-entered data
346
Place individual user in a sparse vector space based on behavior/frequency analysis
344
Include user-entered behavior/demographic information in attributes
Identify clusters in this victor space using statistical analysis/mathematics models
348
Label Individual users with their profile membership, store this label in the database
350
Train ML Classifiers to place individual users into one of the audience profiles
352
354
Is there an existing audience profile?
Yes
No
Cluster behavior grouping to create a new audience profile
356
Analyze clusters to provide names and descriptions for new audience profile
358
Generate new audience profile
360
Associate user with audience profile and its attributes
362
F
D

SYSTEM AND METHOD FOR CLUSTERING END USERS TO SELECT AND DELIVER A NOTIFICATION TO MOBILE DEVICE

TECHNICAL FIELD

This disclosure relates to a system and method for clustering end users to deliver a notification to an end user's mobile device. More specifically, this disclosure relates to a system and method for clustering end users to select and deliver a notification to an end user's mobile device.

BACKGROUND

Notifications or promotions are effective tools to pique consumers' interest in a product or service. The notification can include a coupon, discount, sample give away, or some other promotional offer to incentivize the consumer to try the product or service with the expectation that the consumer will continue to use the product or service afterwards. To maximize the effectiveness of a notification, the notification needs to be distributed to a consumer who is likely to convert on the offer in the notification. Furthermore, the notification needs to be distributed at the right time and at the right location. A general and broad distribution of notifications may overwhelm the consumer causing the consumer to ignore all notifications. Even if the consumer receives a notification that is of interest to him or her but the distribution did not take into account of the location of the consumer, the consumer will need to make an effort to travel to a location that accepts the offer in the notification or remember that he or she has that notification the next time the consumer passes by a facility that accepts the offer in the notification. This inconvenience of traveling to a location that accepts the offer in the notification or remembering that he or she has the notification greatly reduces the chance that the end user will convert the offer in the notification.

Furthermore, it would be advantageous for a marketer to know the effectiveness of a notification. This information allows a marketer to decide whether to run a similar notification in the future, abandon such notification all together, or to modify the notification with the expectation that a modified notification can be more effective. A break down on the effectiveness of a notification by a specific subgroup of end users would also help the marketer to understand how best to target the subgroup of end users.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a system comprising one or more memory devices storing programing instructions and one or more processors configured to execute the program instructions to cause the system to perform operations. The programing instructions comprise: receiving a fence defined by a first user, the fence includes an area having a geographic location, a plurality of notifications and their content attributes are associated with the fence; receiving location and speed from a mobile device of a second user; determining the mobile device of the second user is stationary for a predetermine amount of time; identifying a location attribute for the location of mobile device of the second user; associating the location attribute with the second user; aggregating a plurality of location attributes associated with the second user; determining an audience profile and audience profile attributes for the second user based on the aggregated location attributes for the second user; detecting that the second user has crossed into an area defined by the fence; and in response to detecting the second user crossing the fence: determining a conversion probability based on content attributes of the notifications associated with the fence and audience profile attributes of the audience profile associated with the second user; selecting a notification based the conversion probability; and causing the selected notification to be displayed on the mobile device of the second user.

Also disclosed is a method of delivering notifications to a mobile device. The method comprising the steps of: receiving a fence defined by a first user, the fence includes an area having a geographic location, a plurality of notifications and their content attributes are associated with the fence; receiving location and speed from a mobile device of a second user; determining the mobile device of the second user is stationary for a predetermine amount of time; identifying a location attribute for the location of mobile device of the second user; associating the location attribute with the second user; aggregating a plurality of location attributes associated with the second user; determining an audience profile and audience profile attributes for the second user based on the aggregated location attributes for the second user; detecting that the second user has crossed into an area defined by the fence; determining a conversion probability based on content attributes of the notifications associated with the fence and audience profile attributes of the audience profile associated with the second user; selecting a notification based the conversion probability; and causing the selected notification to be displayed on the mobile device of the second user.

Also disclosed is a non-transitory computer-readable storage medium having machine instructions stored therein. The instructions being executable by a processor to cause the processor to: receive a fence defined by a first user, the fence includes an area having a geographic location, a plurality of notifications and their content attributes are associated with the fence; receive location and speed from a mobile device of a second user; determine the mobile device of the second user is stationary for a predetermine amount of time; identify a location attribute for the location of mobile device of the second user; associate the location attribute with the second user; aggregate a plurality of location attributes associated with the second user; determine an audience profile and audience profile attributes for the second user based on the aggregated location attributes for the second user; detect that the second user has crossed into an area defined by the fence; determine a conversion probability based on content attributes of the notifications associated with the fence and audience profile attributes of the audience profile associated with the second user; select a notification based the conversion probability; and cause the selected notification to be displayed on the mobile device of the second user.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

FIGS. 3A, 3B, and 3C illustrate a method for placing an end user into an audience profile.

DETAILED DESCRIPTION

Figure 1:
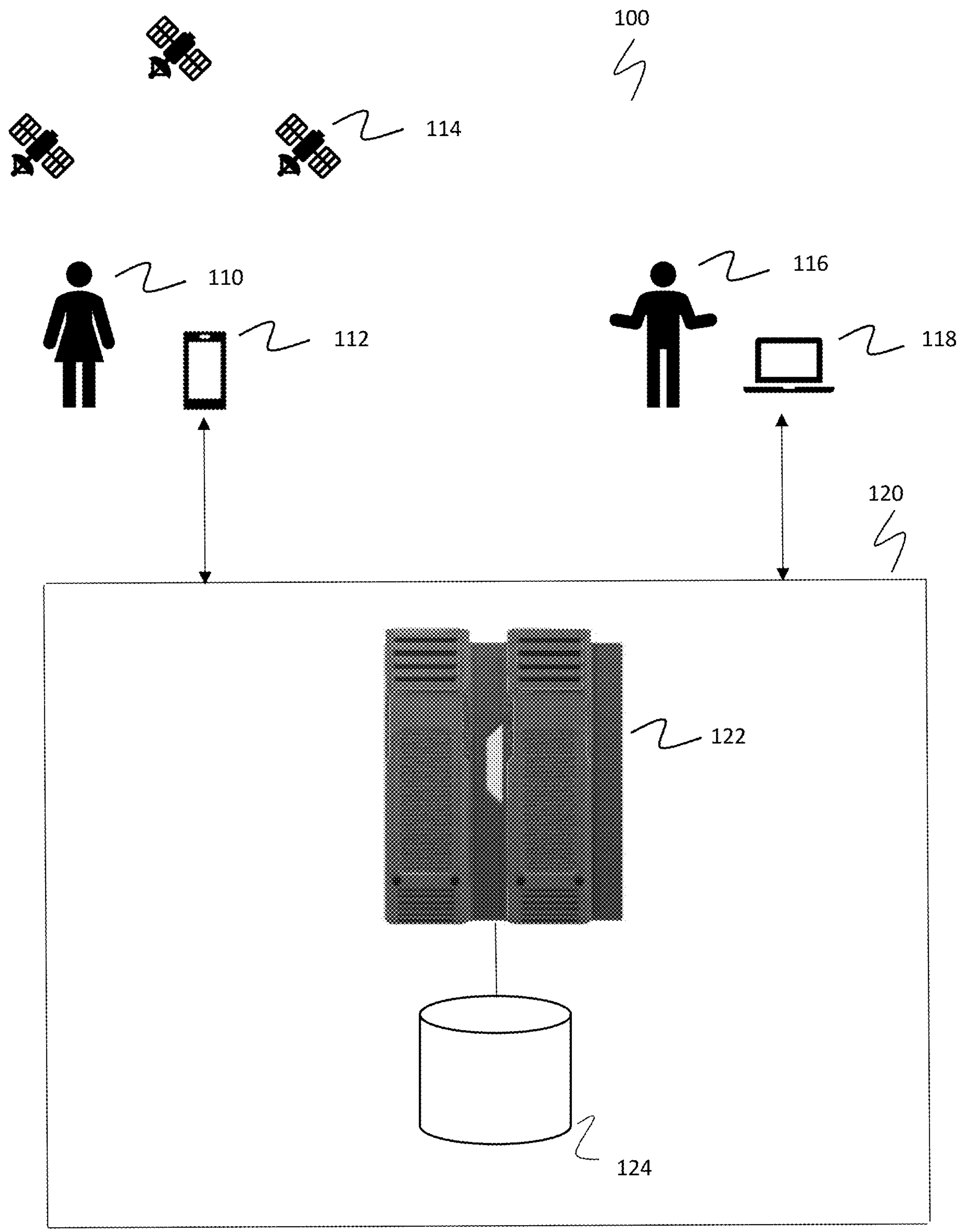
FIG. 1 is a schematic of a mobile device of an end user, a personal computer of a marketer, and a system for clustering end users and selecting and delivering a notification to the mobile device.

The following description is provided as an enabling teaching of the present systems, and/or methods in its best, currently known aspect. To this end, those skilled in the relevant art will recognize and appreciate that many changes can be made to the various aspects of the present systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Environment for Delivering a Notification to Mobile Device

FIG. 1 illustrates an environment 100 of one embodiment of a system 120 for clustering end users and delivering a notification to an end user's mobile device. In one embodiment, the system 120 is accessible by an end user 110, who may be a subscriber to an appl associated with the system 120, through two-way communications with the user's mobile device 112. The end user's mobile device 112 is capable of tracking the mobile device's location through triangulation of satellites (GPS) 114 or through triangulation of cellar towers. The user's mobile device 112 is also capable of tracking the mobile device's speed via an accelerometer and/or changes in location over time through triangulation. It is assumed that the end user 110 is carrying the mobile device 112 or keeps the mobile device close to him or her, such as in the vehicle that the end user is driving. Hence, it can be assumed that the location and speed of the end user's mobile device 112 is approximately the same as the location and speed of the end user 110. Therefore, the location of the end user's mobile device 112 can be used interchangeably with the location of the end user 110 and the speed of the end user's mobile device 112 can be used interchangeably with the speed of the end user 110.

FIG. 1 further illustrates one embodiment of a system 120 accessible by a marketer or an administrator (hereinafter "marketer") 116, involved in marketing products or services to consumers, through two-way communications with the marketer's computer 118 or some other device such as a tablet or a mobile device. The marketer's computer 118 includes an output component, such as a monitor, capable of displaying content from the system 120 and at least one input component, such as a keyboard, mouse, or touch screen, capable of sending requests and inputs to the system 120.

In one embodiment, the system 120 is functionally controlled by a control unit. The control unit includes at least one specially configured processor and at least one controller configured to operate with at least one memory device and at least one data storage device (collectively referred to herein as "memory device") 124.

In one embodiment, control unit includes at least one specially configured processor or central processing unit (CPU). In one embodiment, specially configured processor includes arithmetic logic units and math co-processors also known as floating point units. In one embodiment, specially configured processor includes registers for holding instructions or other data, and cache memory for storing data for faster operation thereupon. In one embodiment, specially configured processor may be a multi-core processor that includes two or more processors for enhanced performance, more efficient parallel processing, or other advantageous computing functions. In another embodiment, specially configured processor may be one or more processing devices such as microprocessor(s) or integrated circuit(s) and may include one or more controllers. It should be appreciated that in some embodiments, a general purpose processor could be programmed to perform the functions of specially configured processor.

A controller, in one embodiment, is a device or a software program that manages or directs the flow of data between two entities. Often, controllers are special purpose circuitry or software that solve a technical communications problem between different technology systems. In one embodiment, a controller functions as an interface between two systems while managing the communications between the systems. In another embodiment, a controller functions as an interface between a processor and a peripheral device and functions to control the peripheral device.

In FIG. 1, at least one specially configured processor and controller (collectively referred to herein as "processor") 122 is configured to communicate with at least one memory device 124. In one embodiment, memory device 124 includes one or more memory structures for storing instructions and various types of data. Memory structures may include one or more random access memory units (RAMs) units, one or more read only memory units (ROMs), one or more flash memory units including solid state drives (SSDs), one or more electrically erasable/programmable read only memory units (EEPROMs).

It should be appreciated that in one embodiment, communication with a memory device by a processor encompasses the processor accessing the memory device, exchanging data with the memory device, or storing data to the memory device.

Memory device 124 may store all program code and operation data necessary for the operation of the system 120 described hereinbelow. In an alternative embodiment, code and operation data necessary for the operation of the system 120 may be store in a distributed manner such that some code is stored in the memory device 124 and other code is stored remotely from system 120. In one embodiment, the code and operation data necessary for the operation of the system includes, for example, basic input and output function data, instruction fetching data, bus and network communication protocol data, and like data.

In addition to the memory device 124 described above, in another embodiment, the code and operation data for the operation of the system described hereinbelow may be stored in removable cartridges or flash drives, a compact disk ROM, a digital versatile disk (DVD) optical storage technology, or suitable other fixed non-transitory storage mediums. In another embodiment, part or all of the code and operational data for operation of the system may be stored in a remote memory structure and be downloaded to the memory device 124 via a network connection.

In one embodiment, the system 120 may utilize any combination of memory devices such as random access memory devices (RAMs), unalterable memory devices (ROMs), and mass storage devices for securely storing and securely communicating the software components or code that facilitate operation and other functions of the system 120.

The subject matter and functional operations described in relation to FIG. 1 can be embodied in hardware, software, or a combination thereof. Described hardware includes the structures described and their functional or operational equivalents. Described functions may be performed by hardware, digital circuitry, computer software, computer firmware, or functionally equivalent combinations thereof.

System and Method for Creating Microfence

Figure 2A:
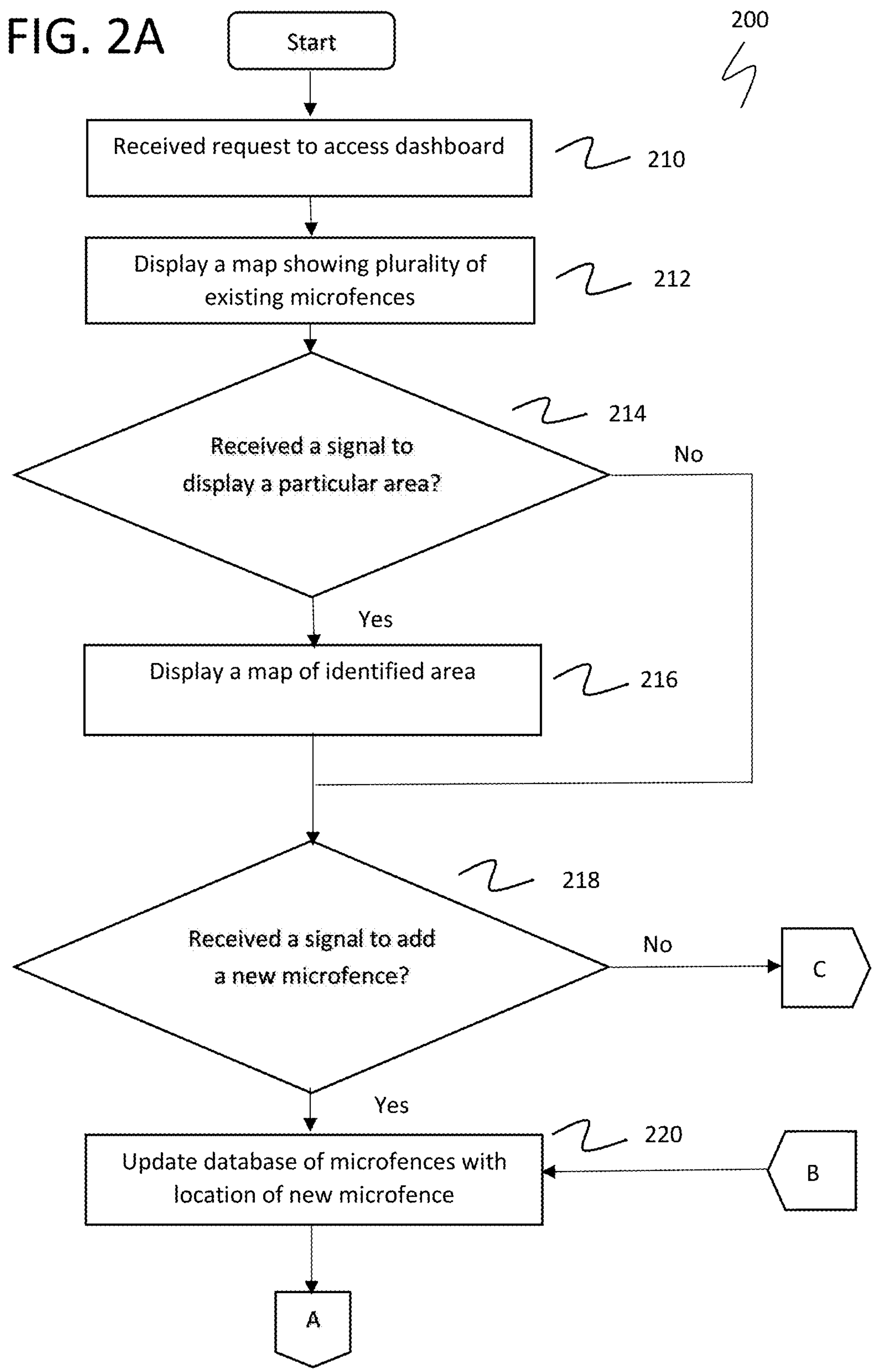
FIGS. 2A and 2B illustrate a method for creating a microfence.
Figure 2B:
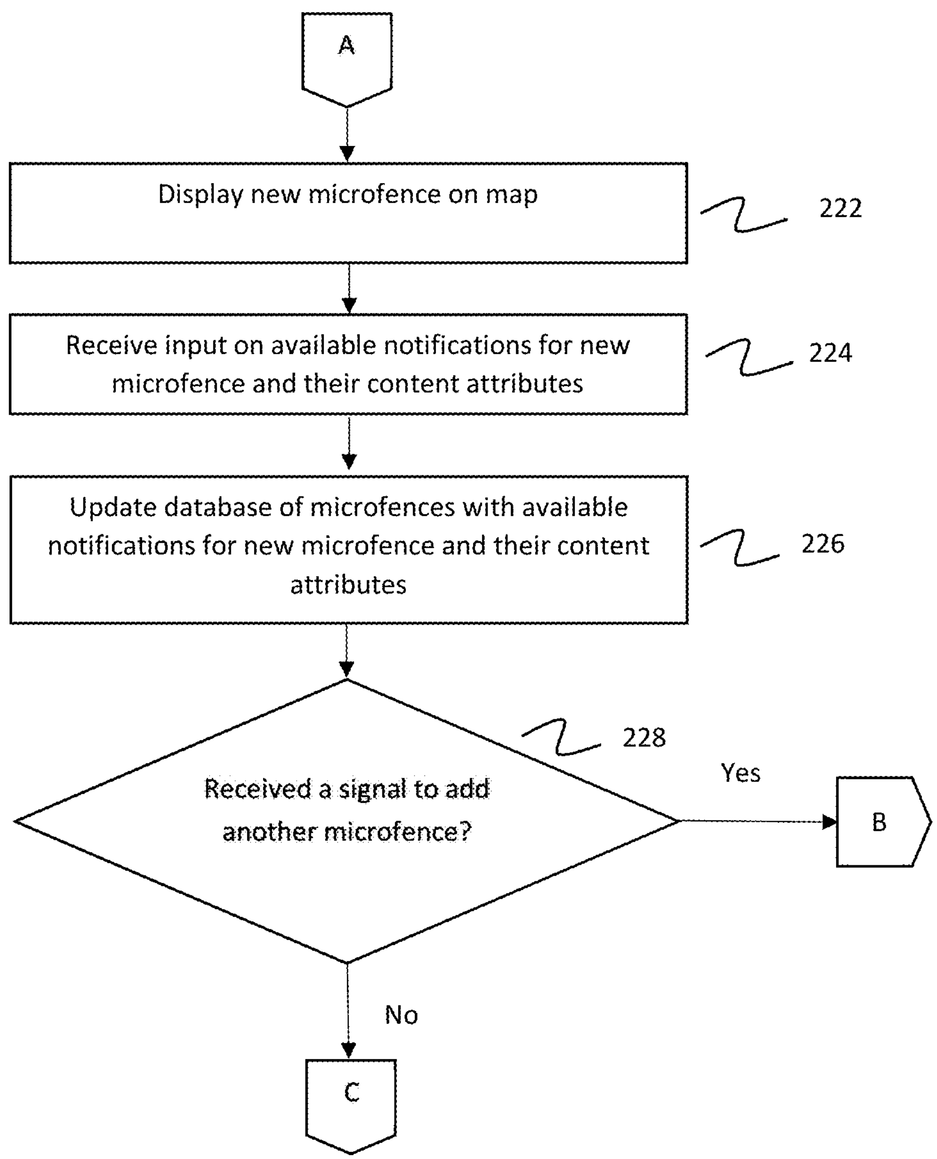

FIGS. 2A and 2B illustrate a flowchart of an example operation 200 of one embodiment of the system and method for creating a microfence.

In one embodiment, a processor 122 of the system 120 (shown in FIG. 1) is configured, via instructions stored in a memory device 124, to perform the operation 200. However, it should be appreciated that other suitable variations of operation 200 are possible. For example, in one embodiment, fewer or one or more additional blocks (not shown) may be employed in operation 200 of the system and method. In other embodiments, the blocks may be performed in any suitable order.

FIG. 2A illustrates one embodiment in which the system 120 receives a request from a computer 118 of a marketer 116 (shown in FIG. 1), to access a dashboard showing locations of existing microfences in accordance to block 210. The microfence can be a geographic area which the system 120 can be triggered to perform certain operations once a mobile device enters the microfence. The microfence can be identified as a particular location (including but not limited to GPS coordinate, latitude and longitude, address, road intersection) and a given radius, such as ¼ mile from the location. After the system receives a request to access a dashboard, in accordance to block 212, the system 120 causes the computer monitor 118 of the marketer 116 to display a map showing a plurality of existing microfences, if any, previously created by the marketer or other users having access to the dashboard. After viewing the originally displayed map, the marketer 116 may decide to zoom in or out to a particular area of interest. In the situation for which the system received a signal to display a particular area of interest, as illustrated in block 214, the system 120 causes the monitor to display a map of that particular area showing the microfences, if any, previously created by the marketer or other users having access to the dashboard, as illustrated in block 216.

After viewing the microfences saved in memory device 124 of the system 120, the marketer 116 may decide to add or create to a new microfence. In the event that the system 120 received a signal from the marketer's computer to add a new microfence, as illustrated in block 218, the system 120 updates the database of microfences with the location and area of the new microfence as illustrated in block 220 and causes the marketer's monitor to display the new microfence on the map, as illustrated in block 222 via off page connector A in FIG. 2B.

In one embodiment, accordance to block 224, the system may receive inputs from the marketer to select, import, and/or create the notifications available for and to be associated with the new microfence, along with the content attributes associated with each notification. The notification includes one or more promotional offers (including but not limited to coupons, discounts, sample give away, and other offers) that are available to an end customer to redeem or convert. The system then updates database of microfences by saving the available notifications for the new microfence to the memory device 124, along with the content attributes for each notification as illustrated in block 226.

After creating a new microfense, the marketer may want to create another microfence. In the event that the processor 122 received a signal to add another microfence in accordance to block 226, the system updates the database of microfences in memory device 124 with location of the second new microfences and the process of operation 200 in accordance to blocks 220, 222, 224, 226, and 228 repeats until the processor 122 no longer receives a signal to add another microfence.

System and Method for Placing End User into an Audience Profile.

FIGS. 3A, 3B and 3C illustrate a flowchart of an example operation 300 of one embodiment of the system and method for placing an end user into an audience profile.

In one embodiment, a processor 122 of the system 120 (shown in FIG. 1) is configured, via instructions stored in a memory device 124, to perform the operation 300. However, it should be appreciated that other suitable variations of operation 300 are possible. For example, in one embodiment, fewer or one or more additional blocks (not shown) may be employed in operation 300 of the system and method. In other embodiments, the blocks may be performed in any suitable order.

As indicted in block 305, the system 120 may receive inputs from a mobile device 112 of an end user 110 (shown in FIG. 1). The inputs include information to identify the end user and to determine the location and the speed of the mobile device 112. The system 120 uses the information received from the mobile device 112 to identify the user in order to determine if an audience profile has been associated with the end user in accordance to block 310. In one embodiment, if an audience profile has not been associated with the user, process of operation 300 continues to block 314 to determine the location and speed of the mobile device. If an audience profile has already been associated with the end user, the process of operation 300 continues to block 312 to determine if a predetermined time period, such as one month, has elapsed since the audience profile for the end user was last reviewed. In accordance to block 312, if the predetermined time period has elapsed since the audience profile for the end user was last reviewed, the system 120 reassesses whether the end user should be placed in a new audience profile by the process of operation 300 continuing to block 314 to determine the location and speed of the mobile device. If the predetermined time period has not elapsed since the audience profile for the end user was last reviewed, the end user will continue to be associated with that audience profile. The audience profile and its attributes can be used for other operations, such as "selecting and delivering a notification to mobile device" to be discussed below in association with FIGS. 4A and 4B, via off page connector D.

In one embodiment, if the mobile device 12 is moving at a speed below a given or predetermine speed (such as 5 m/s or another speed that was predetermined as an indicator that the end user has purposely stopped at a location); in accordance to block 314, the process of operation then proceed to determine whether the end user purposely stopped at a location ("stationary") or whether the end user stopped unintentionally, such as waiting at a traffic light. If the mobile device 112 is not moving below a given speed, the process of operation 300 then goes back to block 305 in which the system 120 may receive, from the mobile device 112, new information to determine the location and speed of the mobile device.

To determine if the end user is stationary, in one embodiment, the system may start a timer in accordance to block 318. After a periodic time interval has elapsed, such as one second, the system determines a new location of the mobile device as indicated by block 320. As indicated by block 322, after the periodic time interval has elapsed, if the location of the mobile device remains within a given distance, such as 10 meters, from the original location determined in block 314, the process of operation continues by determining another new location after a periodic time interval until the timer started in block 318 has surpassed a given or predetermined amount of time, such as twenty seconds, in accordance to block 324. During the time that the predetermined amount of time has not elapsed, if the location of the mobile device is beyond the given distance from the original location determined in block 314, it is assumed that the end user is not stationary and process of operation 300 goes back to block 305 in which the system 120 may receive from the mobile device 112 new information to determine the location and speed of the mobile device.

In one embodiment, after the timer has surpassed the predetermined amount of time and the mobile device remained within the given distance from the original location determined in block 314, the process of operation 300 continues to block 326 via off page connector E in FIG. 3B in which the system 120 then evaluates if the original location determined in block 314 belongs to any current geofence saved in its memory device 124. If the original location belongs to a current geofence saved in the system's memory device, the process of operation 300 continues to block 330. If the original coordinate does not belong to a current geofence saved in the system's memory device, a new geofence is created for this location in accordance to block 328 and then the process of operation 300 continues to block 330.

In one embodiment as shown in block 330, the system submits analysis purpose related data to the Web server through specific web API and then determines the location attributes of the geofence location and saves the location attribute in accordance to block 332. The location attribute can be the type of product or service provided at that location, such a fast food restaurant, a movie theater, a school, a hospital, etc. The identified location attribute is then saved in the memory device 124 of the system 120 as being associated with end user. In accordance to block 334, if a sufficient number of location attributes have been saved for the end user, the system aggregates the end user's visits to the different location attributes per time period (day, week, or month) in accordance to block 336. In one embodiment, the number of sufficient location attributes is at least a number that would be statistically significant to indicate the habit and behavior of the end user. If number of location attributes saved for the end use has not surpassed the sufficient number of location attributes, the process of operation 300 goes back to block 305 via off page connector F in FIG. 3A to continue identifying additional location attributes to associate with the end user.

In one embodiment, if a sufficient number of location attributes have been saved for the end user and the system aggregated the end user's visits to the different the location attributes, the system then group the end user's visits to particular locations by their location attributes, in accordance to block 338. The process of operation 300, then proceed to block 340 in which the system classifies particular distinct behaviors of the end user by taking into account the clustered and chosen visiting patterns of the end user. In accordance to block 342, these particular distinct behaviors and frequencies associated with the end user are then stored in a database.

The process of operation 300 continues to block 344 via off page connector Gin FIG. 3C in which the system 120 then places an identifier for the individual end user in a sparse vector space based on the end user's behavior/frequency analysis. In addition to behaviors based on the end user's aggregated visits to geofence locations, the end user's behaviors can also be derived from end user entered data. In one embodiment, during the app. registration process, the end user may provide personal information about himself or herself, such as his or her preferences and demographics including but not limited to marital status, income range, profession, etc. These user-entered data can be stored in a memory device 124*a*. In accordance to block 346, this user-entered behavior and demographic information can also be used to place the individual end user's identifier in a sparse vector space, in accordance to block 344. The process of operation, in block 348, then identifies clusters in this victor space using statistical analysis/mathematics models. The system 120, in accordance to block 350, then label individual end users with their profile membership and store this label in the database. During this process, a ML Classifier, or other machine learning engine, is trained to place individual users into one of the audience profiles in accordance to block 352. During this process, in accordance to block 354, the system also determines if there is an existing audience profile having location attributes visits that closely matches the end user's aggregated visits to the different location attributes. The audience profile is a hypothetical person that represents a group or cluster of end users having similar attributes. The use of an audience profile allows the system 120 to quickly and efficiently identify the characteristics of an end user by his or her audience profile when determining the spending habits of the end user and hence the probability of the end user converting an offer. In other embodiments, if a sufficient number of location attributes have been saved for the end user and the system aggregated the end user's visits to the different location attributes, the system 120 then determines if there is an existing audience profile that closely matches the aggregated location attributes visits, attributes provided by the end user (such as the user-entered data stored in memory device 124*a*) and/or other attributes collected about the user (such as from public information about the end user available on the internet).

If there is an existing audience profile, the end user is associated with that audience profile, along with the audience profile attributes for that audience profile, in accordance to block 362. The audience profile attributes include the behavior frequency for the audience profile, such as the audience profile's app usage, the audience profile's route commutes, the audience profile's visits to fast food restaurants by car, the audience profile's visits to fast food restaurants by bus, the audience profile's visit to clothing stores, etc. Examples of audience profile attributes will be further discussed in association with FIG. 7. If there is not an existing audience profile which closely matches the end user's aggregated visits to the different location attributes, the system clusters behavior grouping based on behavior frequency attributes, inferred home/work location categories, etc. to create a new audience profile in accordance to block 356. While blocks 350, 352 and 354 are shown in FIG. 3C as sequential steps, those skilled in the relevant art will recognize and appreciate that these steps can performed by the system 120 simultaneously, interchangeably, or in a different order.

In one embodiment, in accordance to block 358, a marketer further analyzes the cluster to provide a name and description for the new audience profile. The system 120 generates and saves the new audience profile in its memory device 124 in accordance to block 360 and the end user is associated with that audience profile and the associated audience profile attributes, in accordance to block 362. The audience profile associated with end user and its attributes can be used for other operations, such as "selecting and delivering a notification to mobile device" to be discussed below in association with FIGS. 4A and 4B, via off page connector D. The process of operation 300 goes back to block 305 via off page connector F in FIG. 3A to continue identifying additional location attributes to associate with the end user.

System and Method for Selecting and Delivering a Notification to Mobile Device.

Figure 4A:
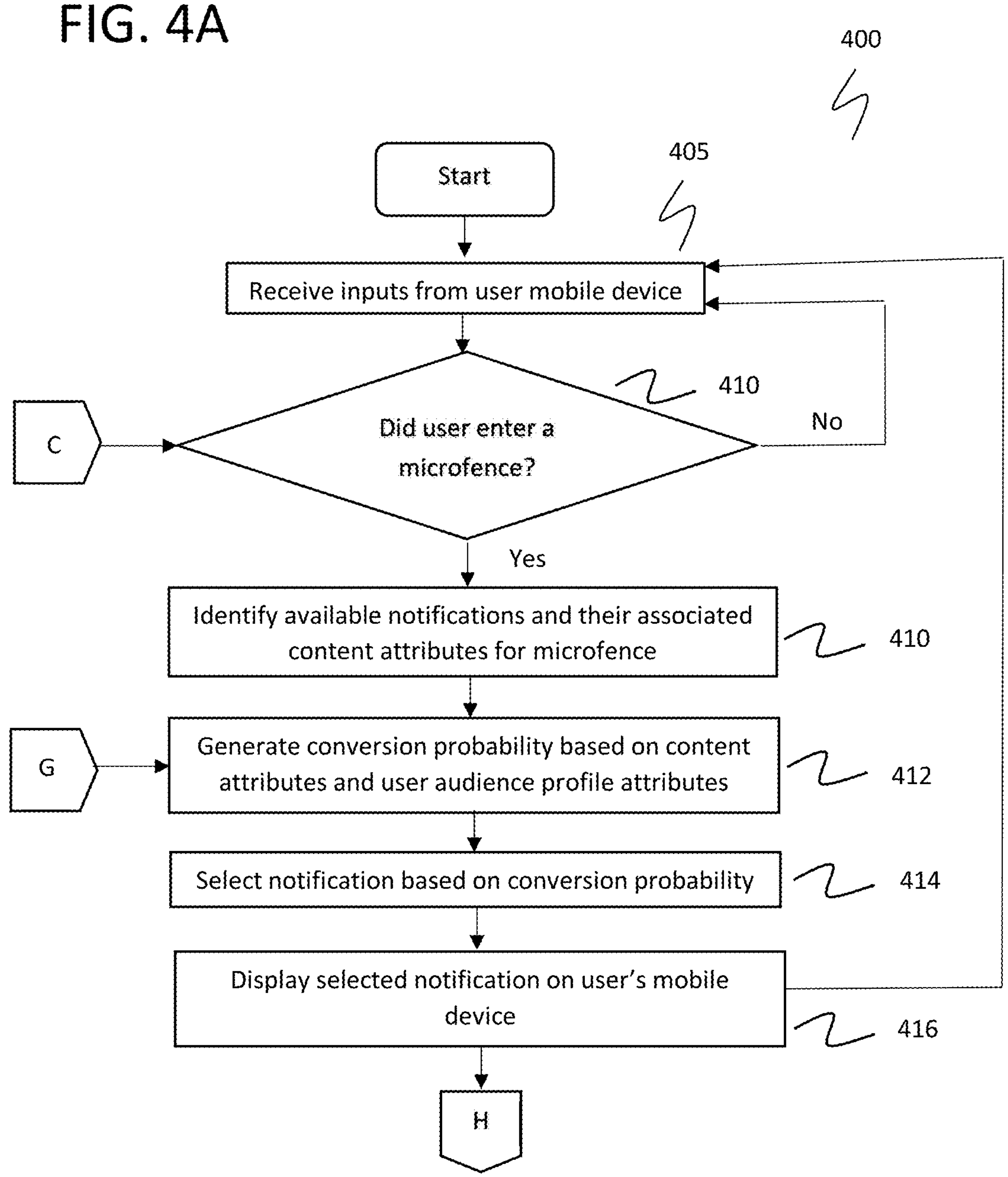
FIGS. 4A and 4B illustrate a method for selecting and delivering a notification to an end user's mobile device.
Figure 4B:
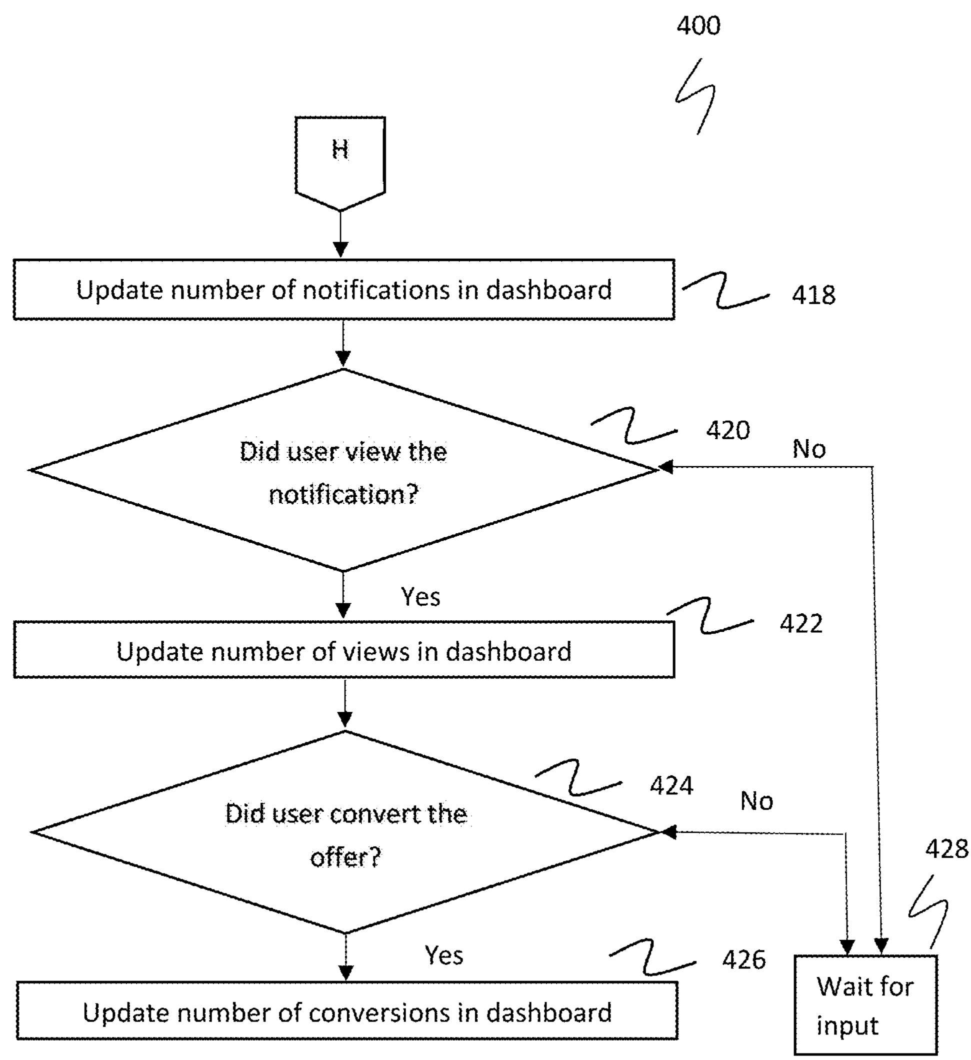

FIGS. 4A and 4B illustrate a flowchart of an example operation 400 of one embodiment of the system and method for selecting and delivering a notification to an end user's mobile device.

In one embodiment, a processor 122 of the system 120 (shown in FIG. 1) is configured, via instructions stored in a memory device 124, to perform the operation 400. However, it should be appreciated that other suitable variations of operation 400 are possible. For example, in one embodiment, fewer or one or more additional blocks (not shown) may be employed in operation 400 of the system and method. In other embodiments, the blocks may be performed in any suitable order.

As indicted in block 405, the system 120 may receive inputs from a mobile device 112 of an end user 110 (shown in FIG. 1). The inputs include information to identify the end user and to determine the location of the mobile device 112. In accordance to block 410, the system then evaluates whether the mobile device 112 and the end user 110 have entered a microfence that was previously created by a marketer 116 through the process of operation 200 illustrated in FIGS. 2A and 2B via off page connector C. If the end user did not enter a microfence, the process of operation 400 goes back to block 405 to receive new inputs, including the end user's new location from the end user's mobile device. If the end user did enter a microfence, in accordance to block 410, the system identifies or retrieves from the memory device 124 the notifications available for and associated with that microfence along with the associated content attributes for each notification. The notification includes one or more promotional offers (including but not limited to coupons, discounts, sample give away, and other offers) that are available to an end customer to redeem or convert. In one embodiment, the content attributes can be the goods and services associated with the offers provided in the notification. In one embodiment, content attributes can include but not limited to fast food, cafe, alcoholic beverage, coffee, soft drink, bus travel, train travel, clothing, and other products or services associated with the offer provided in a notification.

In accordance to one embodiment, based on the audience profile attributes for the audience profile that was previously associated with the end user through the process of operation 300 illustrated in FIGS. 3A, 3B and 3C via off page connector D and the content attributes associated with notifications available for the geofence retrieved in block 410, the system 120 generates a conversion probability for the end user in accordance to block 412. In one embodiment, the conversion probability represents the likelihood or probability that the end user will convert the offer provided in a notification. In accordance to block 414, the system 120 then selects a notification for display to the end user based on the generated conversion probability. The selected notification can be the notification, from the plurality of notifications available for the microfence, that the end user is most likely to convert the offer provided in the notification. Once the system selects a notification based the generated conversion probability, the system causes the end user's mobile device to display the selected notification on the user's mobile device in accordance to block 416. The process of operation continues to repeat to block 405 by receiving new locations and determining if the user has entered another microfence.

Dashboard

In accordance to one embodiment, the process of operation 400 also provides information to the marketer 116 by displaying a dashboard with the number of notifications sent to end users, the number of end users who viewed the notifications and the number of offers that the end users converted. The information displayed on the dashboard assists the marketer to assess the success of the marketing campaign for which the notification is created. After the selected notification has been selected and displayed on the user's mobile device, in one embodiment, the process of operation 400 continues to block 418 via off page connector H in FIG. 4B in which the system 120 updates in its memory device with the number of notifications sent to end users and causes the new number of notifications sent end users to be displayed on a dashboard. The process of operation 400 then continues to block 420 in which the system 120 determines if the end user viewed the notification. In one embodiment, if the system received an signal from the mobile device 112 indicating that the end user 110 viewed the notification, the system updates the number of views by end users in its memory device and causes the new number of views by end user to be displayed on the dashboard in accordance to block 422. If a signal is not received from the mobile device indicating that the end user viewed the notification, it is assumed that the notification has not yet been viewed by the end user. In one embodiment, if a signal has not been received from the mobile device indicating that the end user viewed the notification, the system continues to wait indefinitely for a signal that the end user viewed the notification, in accordance to block 428. In other embodiments, if a signal has not been received from the mobile device indicating that the end user viewed the notification, the system continues to wait until the promotion end date for the offer provided in the notification. If the end customer viewed the notification, the process of operation 400 then continues to block 424 in which the system then determines if the end user converted the offer provided in the notification. In one embodiment, if a signal has been received from the offer service or product provider that the end user converted or redeemed the offer, the system updates in its memory device with the number of conversions by end users and causes the new number of conversions by end user to be displayed on the dashboard in accordance to block 426. If a signal has not been received from the service or product provider indicating that the end user converted the offer provided in the notification, it is assumed that the offer has not yet been converted by the end user. In one embodiment, if a signal has not been received from the service or product provider indicating that the end user converted the offer, the system continues to wait indefinitely from the service or product provider for an input that the end user converted the notification, in accordance to block 428. In other embodiments, if a signal has not been received from the service or product provider indicating that the end user converted the offer, the system continues to wait until the promotion end date for the offer provided in the notification.

FIGS. 5A-B, and 6-8 illustrate screen shots of the dashboard available to be displayed to the marketer. The dashboard includes several information areas and input areas/buttons/icons. These information areas and input areas/buttons/icons are illustrated in a particular arrangement, but may be arranged in any suitable manner in different embodiment. In some embodiments, the dashboard may include more or fewer information areas and input areas/buttons/icon than illustrated. In some other embodiments, the content of the information may be displayed as a table, a bar chart, pie chart, bar graph, or some other format.

Figure 5A:
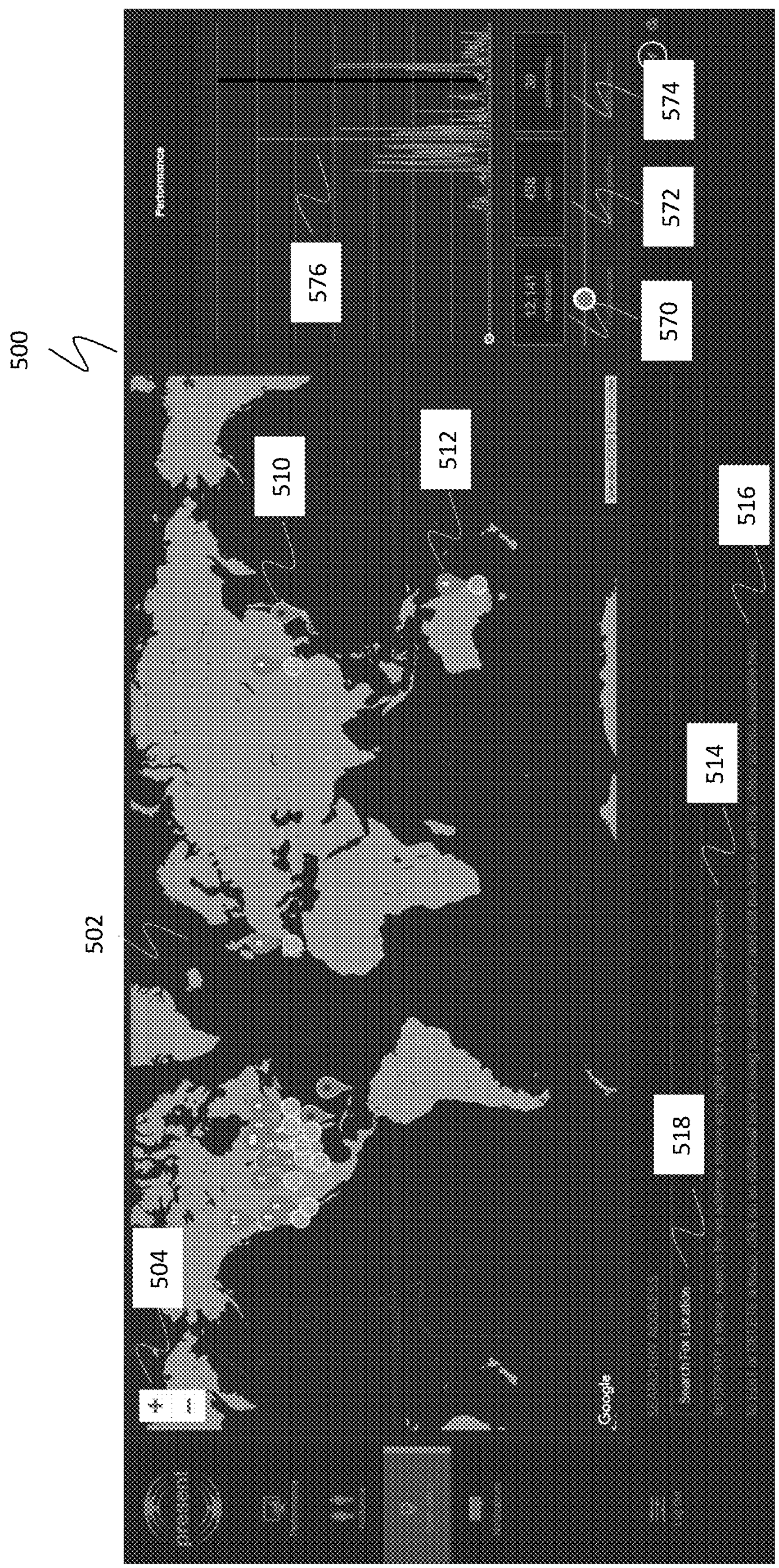
FIGS. 5A and 5B illustrate screen shots of a dashboard showing locations of existing microfences and for receiving inputs to add a new microfence, edit an existing microfence, or delete an existing microfence.

FIG. 5A illustrates one embodiment of a dashboard showing locations of existing microfences and for receiving inputs to add or create a new microfence. The dashboard may be displayed on a computer monitor 118 of a marketer 116 illustrated in FIG. 1. FIG. 5A illustrates a dashboard 500 that includes a map 502 showing the locations of existing microfences 510 that were previously created by the marketer 116 or other user having access to the dashboard 500. In the event that multiple microfences are overlayed on the displayed map scale, a number 512 is displayed to represent the number of microfences located at that region. The dashboard displays the instructions 514 to create a fence and the instructions 516 to edit or delete a fence. The dashboard also provides an input area 518 to search for a location by GPS coordinate, latitude and longitude, address, or road intersection. Should the marketer desires to zoom in or zoom out of the map, the marketer can change the scale of the map by clicking the scale input button 504. Alternatively, the marketer can zoom in a particular region of the map by clicking a particular region on the map 502.

Figure 5B:
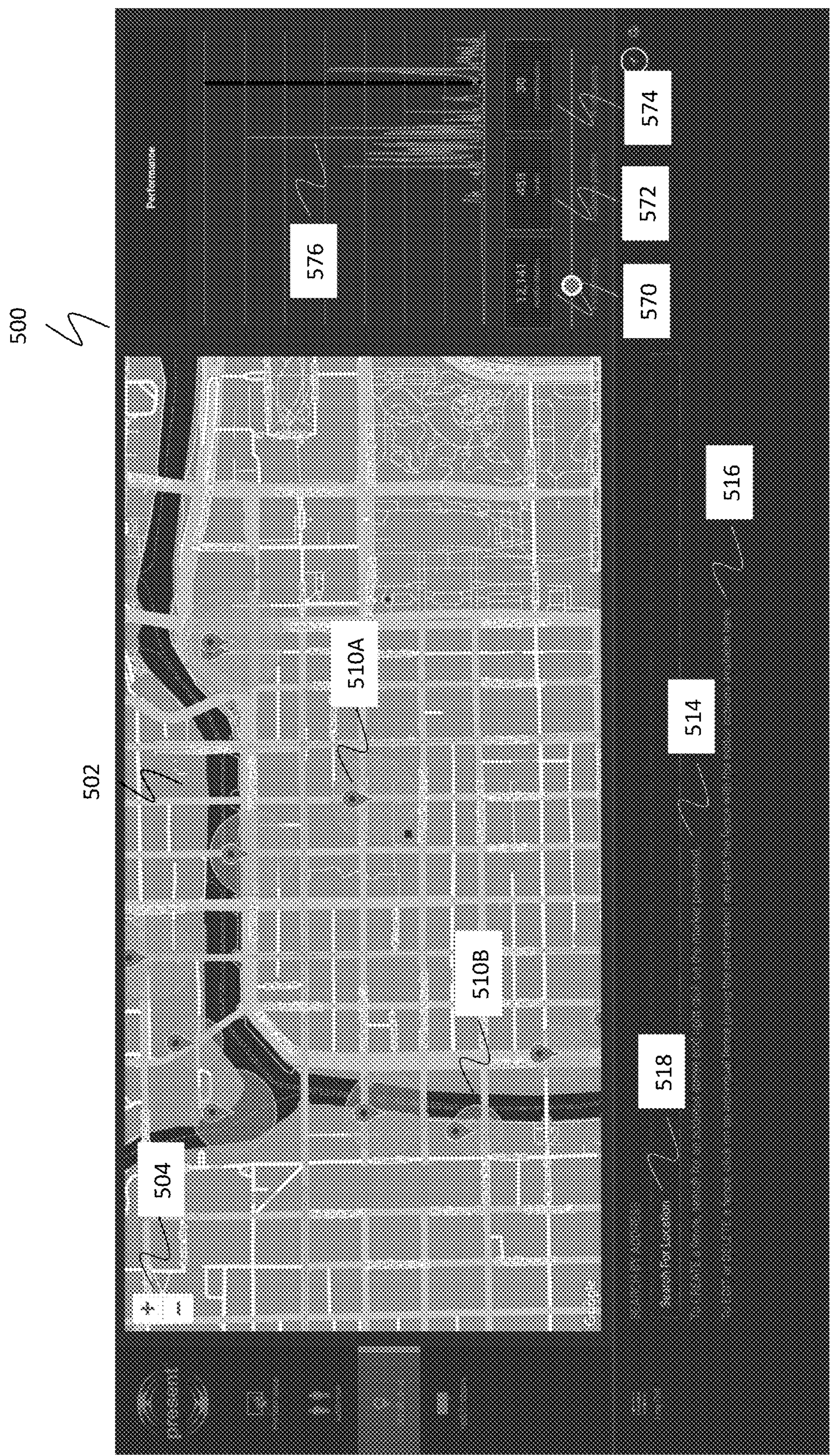

FIG. 5B illustrates the dashboard 500 in which the system 120 received an input from the marketer, either by clicking the scale input button or a particular region of the map, to zoom in a region of downtown Chicago. At this scale of the map, all the individual microfences 510 are visible. In one embodiment, each microfence 510 is identified by a central location (such as GPS coordinate, latitude and longitude, address, or road intersection) and a radius from the central location to define the border of the microfence. It should be noted that the radius from the central location does not need to be the same for all microfences. For instance, the radius from the central location of microfence 510A is approximately one city block (approximately a quarter of a mile) whereas the radius from the central location of microfence 510B is approximately half a city block (approximately an eighth of a mile). In other embodiments, a microfence need not be defined by a central location and a radius from the central location, rather a microfence can be defined by a rectangle representing a city block or a nonuniform shape of a park. In addition to the system receiving inputs to define the location and border of a microfence, in one embodiment, the system can also receive inputs on the notifications that are available for the microfence in accordance to block 224 shown in FIG. 2B.

Figure 6:
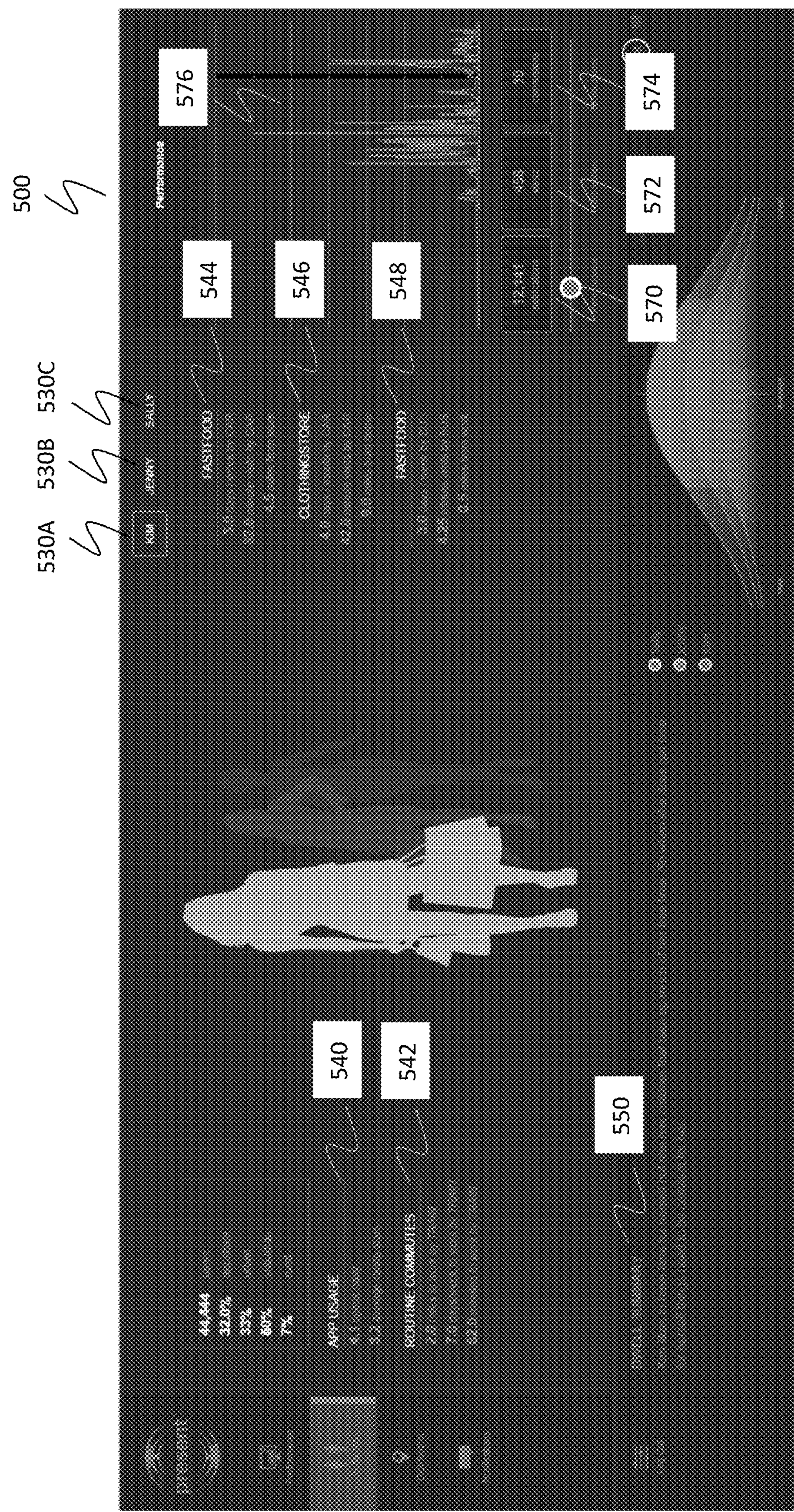
FIG. 6 illustrates a screen shot of a dashboard showing attributes for the audience profile, Kim.

FIG. 6 illustrates one embodiment of the dashboard 500 displaying the attributes for the highlighted/selected audience profile, Kim 530A. Also shown are buttons for audience profiles, Jenny 530B and Sally 530C, although the buttons for these other audience profiles are not highlighted/selected in the dashboard. As previously discussed, Kim is not an actual person. Rather Kim is a hypothetical person that represents a group or cluster of end users having similar attributes. The use of an audience profile, such as Kim, allows the system to identify the habits or attributes of an end user quickly and effectively by grouping or clustering the end user with other end users having similar habits or attributes. In one embodiment, the illustrated dashboard 500 includes app usage 540 for Kim, routine commutes 542 for Kim, fast food visits by car 544 for Kim, clothing store visits by car 546 for Kim, and fast food visits by bus 548 for Kim.

The illustrated dashboard 500 also includes a summary 550 for Kim displaying other attributes. In other embodiments, additional attributes for an audience profile can be determined and displayed, including but not limited to pregnancy, estimated income level, neighborhood type (suburban, rural, urban), religious beliefs, dining habits, exercise habits, education level, age/phase of life, and health problems. For the illustrated embodiment, should the marketer wish to view the attributes for one of the other audience profiles, the marketer can click on the button for Jenny 530B or Sally 530C. In other embodiments more or fewer audience profiles can be available in the dashboard 500.

Figure 7:
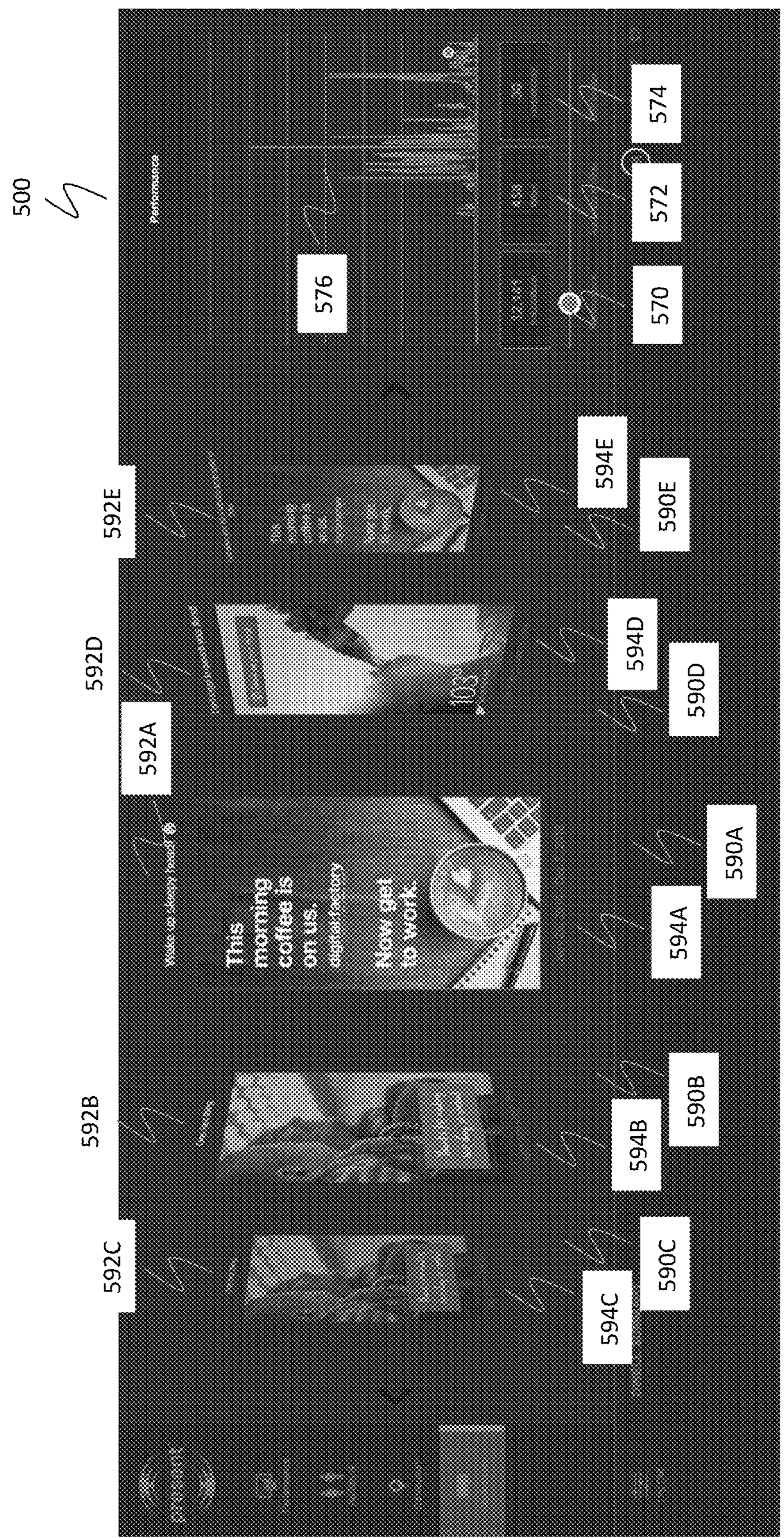
FIG. 7 illustrates a screen shot of a dashboard showing a plurality of notifications and performance of the highlighted notification.

FIG. 7 illustrates one embodiment of the dashboard 500 showing the notifications 590A-E available for a particular microfence. The dashboard 500 displays the notifications 590A-E that are available to the end users, the name 592A-E of each notification and the promotion date range 594A-E of each notification. As illustrated in FIG. 7, and also FIGS. 5A, 5B and 6, the performance of the highlighted notification 590A is displayed. For the highlighted notification 590A, the dashboard displays in display area 570 the number of notifications that this highlighted notification 590A had been sent to end users. In one embodiment, the number of notifications displayed in display area 570 is updated in the process of operation 400 in block 418 in FIG. 4B. The dashboard also displays in display area 572 the number of views of the highlighted notification 590A by end users and displays in the display area 574 the number of conversions of the offers provided in the highlighted notification 590A. In one embodiment, the number of views and the number of conversions displayed in display areas 572 and 574 are updated in the process of operation 400 in blocks 422 and 426 in FIG. 4B. The performance of the highlighted notification 590A can also be illustrated graphically by one or more graphs in display area 576 as shown in FIGS. 5A, 5B, 6 and 7.

Figure 8:
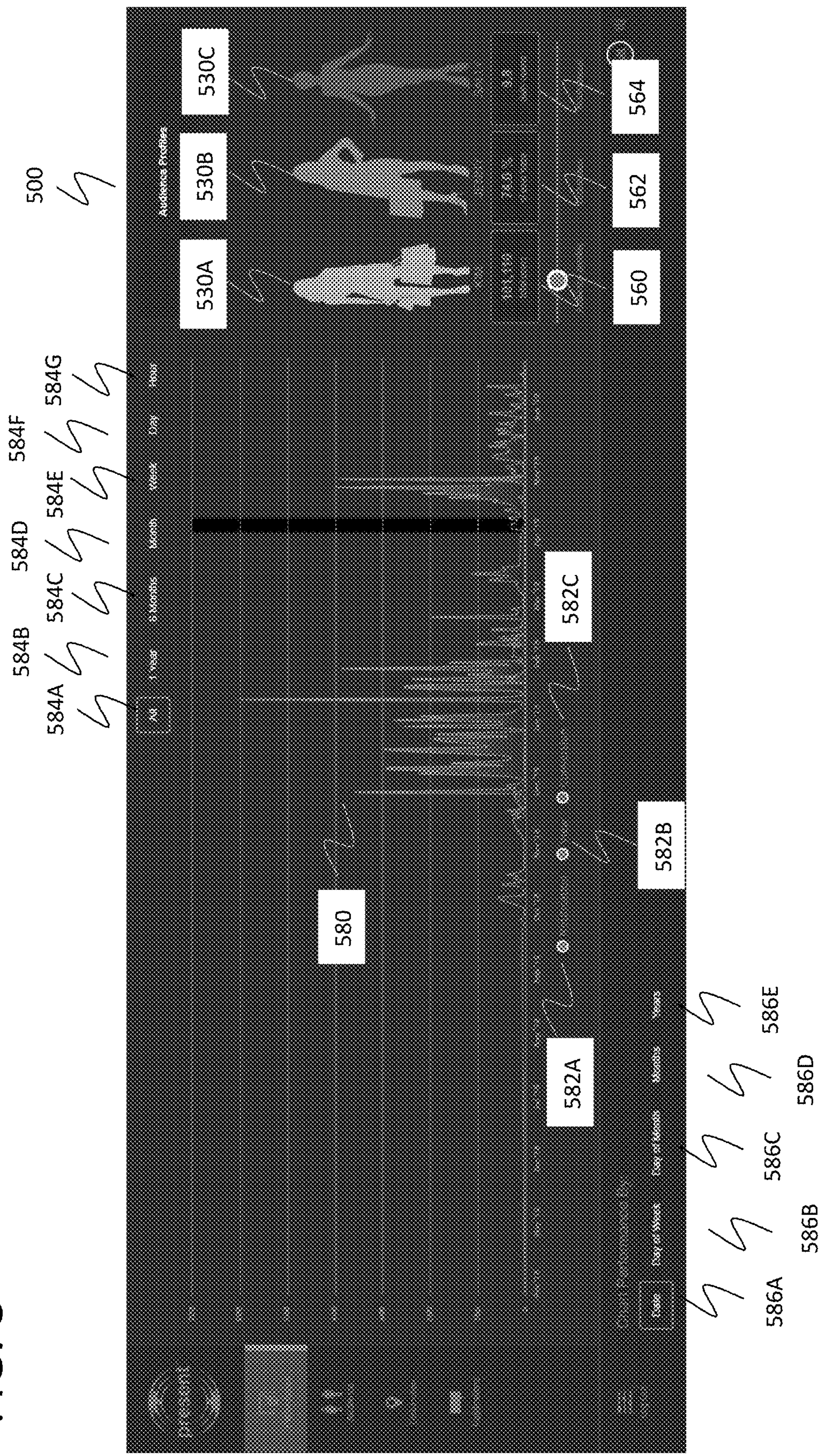
FIG. 8 illustrates a screen shot of a dashboard showing the statistics and performance for the audience profile, Kim.

FIG. 8 illustrates one embodiment of the dashboard 500 displaying the statistic and performance for a particular audience profile 530 from the possible audience profiles, Kim 530A, Jenny 530B and Sally 530C. The illustrated dashboard 500 shows the statistics and performance for Kim 530A, the selected and highlighted audience profile. In one embodiment, the dashboard 500 displays in the display area 560 the total number of end users that are associated with the Kim audience profile 530A. The dashboard 500 also displays in the display area 562 the percentage of total end users that are associated with the Kim audience profile and displays in the display area 564 the average number of new end users that are being associated with the Kim audience profile each day.

In addition to providing the statistics for the Kim audience profile, in one embodiment, the dashboard displays one or more graphs 580 showing the performance for the Kim audience profile. The graphs 580 illustrated in FIG. 8 include a graph showing the number of notifications 582A sent to end users associated with the Kim audience profile. The graphs illustrated in FIG. 8 also include a graph showing the number of views 582B made by end users associated with the Kim audience profile and a graph showing the number of offer conversions 582C made by end users associated with the Kim audience profile in response to viewing the notifications. The performance graphs 580 can be for all time periods, as illustrated in FIG. 8, by selecting the "All" button 584A. Alternatively, the displayed time period for the graphs 580 can be changed by selecting the "1 Year" button 530B, the "6 Months" button 530C, the Month" button 530D, the "Week" button 530E, the "Day" button 560F, or the "Hour" button 560G. The performance graphs 580 can be displayed in increments of each date, as illustrated in FIG. 8, by selecting the "Date" button 586A. Alternatively, the graphs 580 can be displayed in other increments by selecting the "Day of Week" button 586B, the "Day of Month" button 586C, the "Months" button 586D, or the "Years" button 586E.

Figure 9:
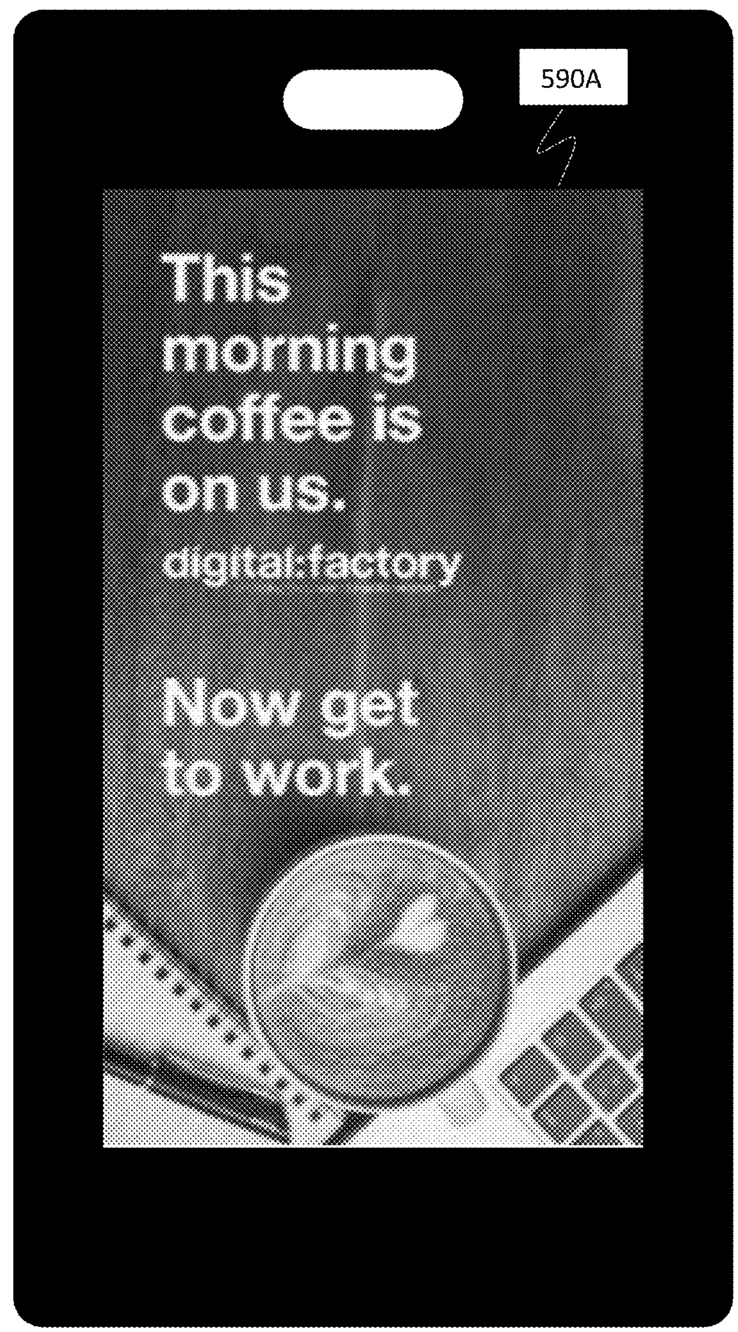
FIG. 9 illustrates a mobile device displaying a notification selected by the system.

FIG. 9 illustrates a mobile device 112 of the end user 110 displaying the selected notification 590A in FIG. 7. In accordance to block 414 in FIG. 4A, the system selects a notification 590, from the plurality of notifications available for and associated with the microfence 510 that the end user has entered, based on the audience profile attributes for the audience profile associated with the end user and the content attributes associated with the notifications available for the microfence. Once the system selects the notification, the system 120 causes the end user's mobile device 112 to display the selected notification in accordance to block 416. In one embodiment, the notification may include one or more promotional offers (including but not limited to coupons, discounts, sample give away, and other offers) that are available to a customer to redeem or convert. In other embodiments, the notification may also include additional information about the promotional offer, such as the effective dates of the offer. FIG. 9 illustrates the notification on the end user's mobile device offering a free cup of coffee.

A number of embodiments of the invention have been described. Various modifications may be made without departing from the spirit and scope of the invention. For example, various forms of the flows shown above may be used, with steps re-ordered, added, or removed. The following claims in its broader aspects is therefore not limited to the specific details, representative system and method, and illustrative example shown and described. Accordingly, other embodiments are within the scope of the following claims.

We claim:

1. A system comprising:

one or more memory devices storing programing instructions;

one or more processors configured to execute the program instructions to cause the system to perform operations comprising:

receiving a fence defined by a first user, the fence includes an area having a geographic location, a plurality of notifications and their content attributes are associated with the fence;

receiving location and speed from a mobile device of a second user;

determining the mobile device of the second user is stationary for a predetermined amount of time;

identifying a location attribute for the location of mobile device of the second user;

associating the location attribute with the second user;

aggregating a plurality of location attributes associated with the second user;

determining an audience profile and audience profile attributes for the second user based on the aggregated location attributes for the second user;

detecting that the second user has crossed into an area defined by the fence; and in response to detecting the second user crossing the fence:

determining a conversion probability based on content attributes of the notifications associated with the fence and audience profile attributes of the audience profile associated with the second user;

selecting a notification based the conversion probability;

causing the selected notification to be displayed on the mobile device of the second user;

determining that the second user converted on an offer shown on the selected notification; and causing a monitor to display total number of conversions of an offer shown on the selected notification viewed by all users.

2. The system of claim 1, wherein the one or more processors further cause a monitor to display total number of selected notifications sent to all users.

3. The system of claim 2, wherein the one or more processors further update the displayed total number of selected notifications sent to all users.

4. The system of claim 1, wherein the one or more processors further determines that selected notification has been viewed.

5. The system of claim 4, wherein the one or more processors further cause a monitor to display total number of selected notifications viewed by all users.

6. The system of claim 5, wherein the one or more processors further update the displayed total number of selected notifications viewed by all users.

7. The system of claim 1, wherein the one or more memory devices further store a plurality of audience profile attributes associated with an audience profile.

8. The system of claim 1, wherein the one or more memory devices further store a plurality of notifications available for the fence.

9. The system of claim 8, wherein the one or more memory devices further store a plurality of content attributes for each notification.

10. The system of claim 1, wherein selecting a notification based the conversion probability involves selecting the notification that shows an offer that the second user is mostly likely to convert.

11. The system of claim 1, wherein determining the mobile device of the second user is stationary for a predetermined amount of time involves receiving location periodically from the mobile device of the second user to determine if the mobile device was located beyond a predetermined distance from the original location during the predetermined amount of time.

12. A system comprising:

one or more memory devices storing programing instructions;

one or more processors configured to execute the program instructions to cause the system to perform operations comprising:

receiving a fence defined by a first user, the fence includes an area having a geographic location, a plurality of notifications and their content attributes are associated with the fence;

receiving location and speed from a mobile device of a second user;

determining the mobile device of the second user is stationary for a predetermined amount of time, location where the second user remained stationary for a predetermined amount of time creates a second fence;

identifying a location attribute for the location of mobile device of the second user;

associating the location attribute with the second user;

aggregating a plurality of location attributes associated with the second user;

determining an audience profile and audience profile attributes for the second user based on the aggregated location attributes for the second user;

detecting that the second user has crossed into an area defined by the fence; and in response to detecting the second user crossing the fence:

determining a conversion probability based on content attributes of the notifications associated with the fence and audience profile attributes of the audience profile associated with the second user;

selecting a notification based the conversion probability; and causing the selected notification to be displayed on the mobile device of the second user.

13. The system of claim 12, wherein the one or more processors further cause a monitor to display total number of selected notifications sent to all users.

14. The system of claim 13, wherein the one or more processors further update the displayed total number of selected notifications sent to all users.

15. The system of claim 12, wherein the one or more processors further determines that selected notification has been viewed.

16. The system of claim 15, wherein the one or more processors further cause a monitor to display total number of selected notifications viewed by all users.

17. The system of claim 16, wherein the one or more processors further update the displayed total number of selected notifications viewed by all users.

18. The system of claim 12, wherein the one or more memory devices further store a plurality of audience profile attributes associated with an audience profile.

19. The system of claim 12, wherein the one or more memory devices further store a plurality of notifications available for the fence.

20. The system of claim 19, wherein the one or more memory devices further store a plurality of content attributes for each notification.

21. The system of claim 12, wherein selecting a notification based the conversion probability involves selecting the notification that shows an offer that the second user is mostly likely to convert.

22. The system of claim 12, wherein determining the mobile device of the second user is stationary for a predetermined amount of time involves receiving location periodically from the mobile device of the second user to determine if the mobile device was located beyond a predetermined distance from the original location during the predetermined amount of time.

23. A system comprising:

one or more memory devices storing programing instructions;

one or more processors configured to execute the program instructions to cause the system to perform operations comprising:

receiving a fence defined by a first user, the fence includes an area having a geographic location, a plurality of notifications and their content attributes are associated with the fence;

receiving location and speed from a mobile device of a second user;

determining the mobile device of the second user is stationary for a predetermined amount of time, location where the second user remained stationary for a predetermined amount of time created a second fence, the one or more memory devices store location of the second fence and its location attributes;

identifying a location attribute for the location of mobile device of the second user;

associating the location attribute with the second user;

aggregating a plurality of location attributes associated with the second user;

determining an audience profile and audience profile attributes for the second user based on the aggregated location attributes for the second user;

detecting that the second user has crossed into an area defined by the fence; and in response to detecting the second user crossing the fence:

determining a conversion probability based on content attributes of the notifications associated with the fence and audience profile attributes of the audience profile associated with the second user;

selecting a notification based the conversion probability; and causing the selected notification to be displayed on the mobile device of the second user.

* * * * *